Oct. 11, 1949.  E. H. BARNES  2,484,264
GARDEN TRACTOR EQUIPPED WITH LATERALLY
SHIFTABLE EARTH WORKING IMPLEMENT
Filed Dec. 17, 1947
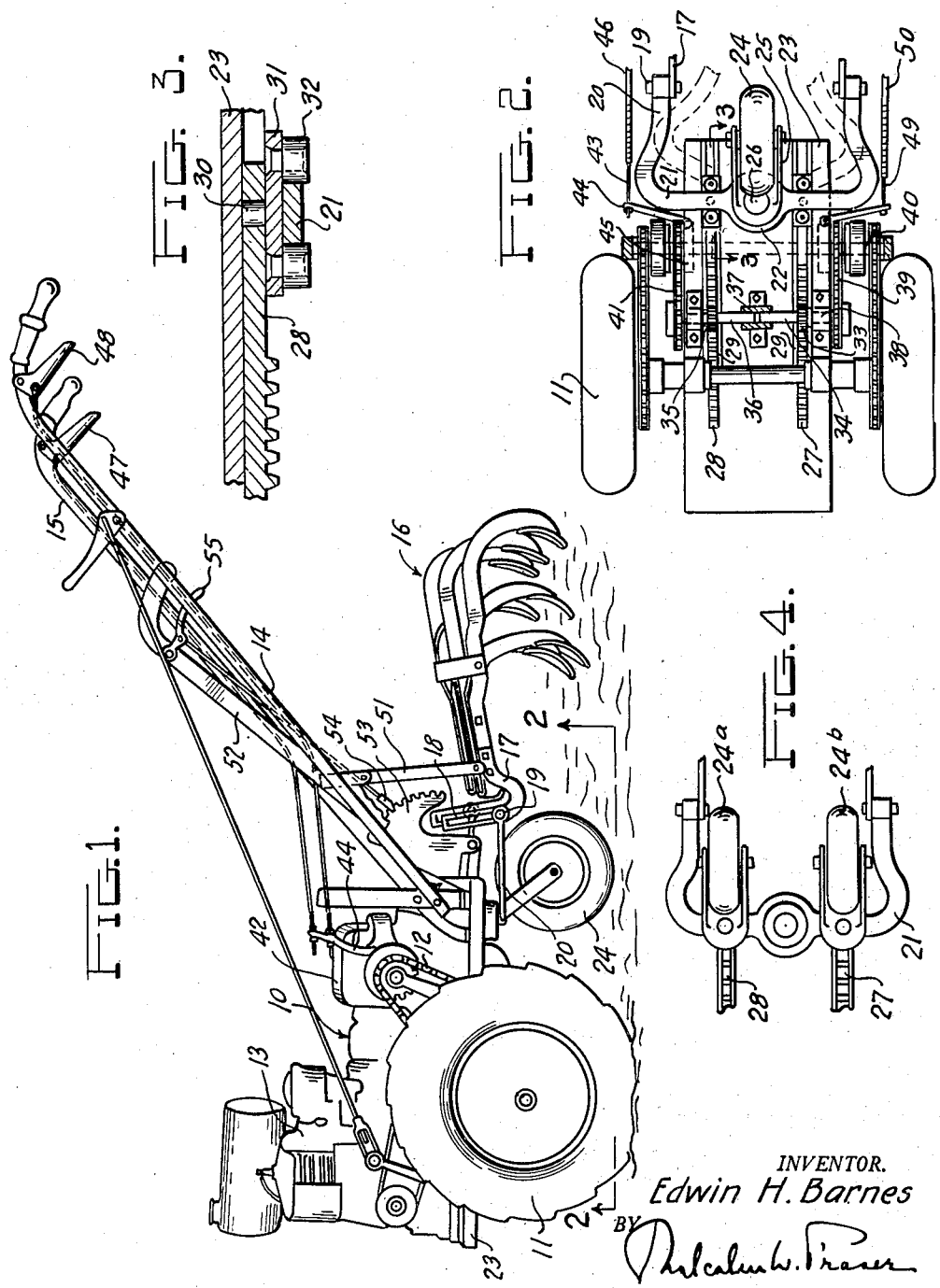
INVENTOR.
Edwin H. Barnes
BY
ATTORNEY Patented Oct. 11, 1949

2,484,264

UNITED STATES PATENT OFFICE 2,484,264

GARDEN TRACTOR EQUIPPED WITH LATERALLY SHIFTABLE EARTH WORKING IMPLEMENT

Edwin H. Barnes, Oak Harbor, Ohio

Application December 17, 1947, Serial No. 792,303

8 Claims. (Cl. 97—48)

This invention relates to earth working implements but more particularly to a power driven garden cultivator, and an object is to enable the earth working implement on a tractor to be shifted readily and conveniently by power means in one direction or the other.

Another object is to produce a garden cultivator by which the cultivator may be selectively shifted laterally in one direction or the other by means deriving its power from the tractor engine.

A further object is to produce a power driven garden cultivator in which the cultivator can be swung in one direction or the other from a power take-off, clutch means being provided so that by manual control, the cultivator may be swung in one direction or the other and to the extent desired without stopping the tractor or the tractor engine.

Other objects and advantages of the invention will hereinafter appear, and for purposes of illustration but not of limitation, an embodiment of the invention is shown in the accompanying drawings, in which Figure 1 is a side elevation of a garden cultivator in which the cultivator unit may be selectively shifted laterally in one direction or the other;

Figure 2 is a bottom plan view of the cultivator shown in Figure 1, and taken substantially on the line 2—2 of Figure 1;

Figure 3 is an enlarged fragmentary sectional view substantially on the line 3—3 of Figure 2; and Figure 4 is a fragmentary plan view of an alternate form embodying two rear supporting or caster wheels.

The illustrated embodiment of the invention comprises a power driven garden cultivator 10 having a pair of rubber tired tractor wheels 11 which are suitably driven by a sprocket and chain drive 12 from a gasoline or internal combustion engine 13. A pair of upwardly and rearwardly extending handle bars 14 and 15 are suitably connected to the frame of the tractor to enable the operator walking in rear of the tractor to guide it during its working operations. In rear of the tractor is an earth working implement 16 which, in this instance, is in the form of a cultivator having a series of the usual blades arranged in staggered formation, although the particular form of the cultivator forms no part of the present invention, it being understood that other forms of earth working implements may be used to advantage.

Rigidly secured to opposite sides of the implement 16 at the front end thereof are arms 17 which are generally L-shaped with the upright portion of each arm formed with elongate slots 18 in which pins 19 are adapted to slide respectively. The pins 19 are secured to a substantially U-shaped actuating member and hitch having a pair of rearwardly extending arms 20 integral with a cross arm 21. The central portion of the cross arm 21 is formed with an enlargement 22 of substantially disc form which is disposed beneath the bed 23 of the tractor for rocking or pivotal movements relatively thereto. Directly beneath the disc portion 22 is a relatively small supporting wheel 24 which is supported by a suitable bracket 25, a king pin 26 passing the bracket and disc portion 22 through the bed 23 to hold these parts in position and to afford the pivotal movement above mentioned. The mounting is such that the wheel 24 can swing freely in one direction or the other according to tractor movement.

It is desirable to shift the cultivator 16 laterally of the tractor in one direction or the other without stopping the tractor and while the latter is in operation so as to bring the cultivator nearer to or away from some particular plant or object. For this purpose, on the under side of the bed 23 is a pair of rack bars 27 and 28 which are guided for movement longitudinally of the bed by suitable gibs 29. The rack bars 27 and 28 are arranged on opposite sides of the king pin 26 and pivotally connected to the under side of each of the rack bars by a pin 30 is a plate 31 carrying a pair of longitudinally spaced, depending rollers 32 between which is disposed the cross arm 21 of the U-shaped actuator member above described. The arrangement is such that one or the other of the rack bars 27 and 28 may be shifted rearwardly. Thereby, through the connection above described, the actuator member is rocked about the king pin 26 in one direction or the other for swinging or shifting the cultivator 16 to the right or left of the tractor. Manifestly, when the rack bar 28, for example, is moved rearwardly of the tractor, the rack bar 27 will be moved forwardly.

Mechanism is provided for selectively moving the rack bars by power means, and for this purpose, a pinion 33 mounted on a shaft 34 engages the rack bar 27. A pinion 35 mounted on a shaft 36 engages the rack bar 28. The inner ends of the shafts 34 and 36 are supported by a bearing housing 37 secured to the under side of the bed 23 and on the outer side of each rack bar, the shafts are supported respectively by bearings 38. The outer end of the shaft 34 has a sprocket and chain connection 39 with a coupling part free on the tractor driven shaft 40. Similarly, the shaft 36 has a sprocket and chain connection 41 with a coupling part free on the driven shaft 40. Manifestly, the shaft 40 is connected by suitable reduction gearing contained in the gear case 42 affording the power takeoff operative to drive the sprocket and chain connections 12 to the traction wheels 11.

In order operatively to connect the coupling forming a part of the sprocket and chain connection 39 or 41 with the shaft 40, a wire 43 connects at its outer end to an operating arm 44 suitably connected to a coupling part 45. The wire 43 passes through a tube or sheath 46 and extends to an operating lever 47 on the outer end of the handle bar 15. Thus by rocking the lever 47, the wire 43 is pulled to actuate the arm 44 to move the coupling part 45 into operative engagement thereby to drive the sprocket and chain connection 41. Associated with the handle bar 14 is a similar lever 48 from which extends a wire 49 through a sheath or tube 50 to a similar lever for operating a clutch part associated with the sprocket and chain drive 39. Thus it is apparent that either the rack bar 27 is power actuated to shift or swing the cultivator frame in one direction, or the pinion 35 may be driven for actuating the rack bar 28 to swing the cultivator frame in the opposite direction. By releasing either lever 47 or 48, the respective clutch is disengaged and the cultivator remains in the adjusted position.

As indicated in Figure 4, instead of a single supporting wheel 24, two supporting wheels 24a and 24b may be provided, thereby to afford spaced wheel support for the rear end portion of the tractor. As shown, the wheels 24a and 24b are disposed on opposite sides of the king pin 26 and may be suitably journalled to the under side of the cross bar 21 of the cultivator frame.

In order to raise the cultivator 16 from the ground, a link 51 pivotally connects the front end portion of the cultivator with a lever 52 which is pivoted at its lower end to a toothed sector 53 which can swivel on the tractor bed. Figure 1 shows the cultivator in its raised position. By rocking the lever arm 52 rearwardly, the cultivator may be lowered with respect to the ground, the slots 18 in the L-shaped arm 17 enabling such movement. A spring tensioned dog 54 on the lever 52 can be manipulated by a grip lever 55 and normally engages a notch in the sector 53 to retain the cultivator in the desired position of adjustment, either in its raised position or in its lowered working position. Manifestly the cultivator may be swung manually by the lever 52 in one direction or the other.

From the above description, it will be manifest that I have produced an exceedingly simple mechanism by which a cultivator or other earth working implement may be shifted laterally in one direction or the other while the machine is in operation or while it is moving forwardly. Although in the embodiment of my invention, I have illustrated mechanical means for effecting such shifting or swinging movement, other means may be employed without departing from the spirit of the invention, an important feature of which is to effect such shifting movement by power generated by the tractor engine. Manifestly, instead of mechanical means for effecting such shifting movement, the rack bar as above described may be replaced by pistons of a hydraulic piston and cylinder assembly or pneumatic means, the hydraulic or pneumatic pump in such case being driven from the tractor engine.

The advantage of using the caster wheels such as 24 or 24a and 24b resides in controlling the depth of the cultivator during its work and also the balancing of the tractor, facilitating turning and maneuvering. These wheels also support the cultivator out of the ground.

It should also be understood that the lever 52 enables the cultivator to be readily lifted or lowered and also enables the cultivator to be disposed at the same depth in the ground resulting in easier operating and more uniform cultivating.

Numerous changes in details of construction, arrangement and operation may be effected without departing from the spirit of the invention especially as defined in the appended claims.

What I claim is:

1. A power driven tractor, a ground working implement at the rear of the tractor, a hitch connecting said implement and said tractor, means mounting said hitch for lateral shifting movements, a pair of laterally spaced rectilinearly movable members connected at one end respectively to laterally spaced portions of said hitch so that upon movement of each of said members in one direction or the other, the hitch and implement are shifted laterally in one direction or the other, normally inoperative propelling mechanisms for said rectilinearly movable members respectively deriving power from the tractor, and control devices for selectively rendering operative one or the other propelling mechanism.

2. A power driven tractor as claimed in claim 1, in which the rectilinearly movable members are disposed in parallel relation longitudinally relative to the tractor.

3. A power driven tractor as claimed in claim 2, in which the rectilinearly movable members comprise rack bars and the propelling mechanisms include pinions meshing respectively with said rack bars.

4. A power driven tractor as claimed in claim 3, in which the control devices include clutches for operatively connecting the pinions to the tractor drive.

5. A garden tractor having a self-contained power plant, an implement at the rear of the tractor, a hitch connecting said implement and said tractor, a pivotal mounting for the hitch enabling same to swing laterally in one direction or the other, a pair of laterally spaced bars mounted on said tractor and connected to said hitch for imparting swinging movement to said hitch and implement, drive means drivingly connected to said bars, respectively, and operative connections between said drive means and the tractor power plant, said connections including manually operated clutches for driving one drive means or the other.

6. A garden tractor having a self-contained power plant, a cultivator at the rear of the tractor, a hitch connecting said cultivator and said tractor, a pivotal mounting for the hitch enabling same to swing laterally in one direction or the other, a pair of laterally spaced rack bars mounted on said tractor and connected to said hitch for imparting swinging movement to said hitch and implement, drive pinions meshing with said rack bars respectively, and operative connections between said pinions and the tractor power plant, said connections including manually operated clutches for driving one pinion or the other.

7. A power driven tractor as claimed in claim 5, in which the hitch between the implement and tractor comprises a U-shaped frame, a pivotal connection between the cross arm of the U and the tractor.

8. A garden tractor having a self-contained power plant, a cultivator at the rear of the tractor, a U-shaped actuator, the free ends of which are secured to the forward end of the cultivator, a pivotal connection between the central portion of the cross member of the U and the tractor enabling the cultivator to swing laterally in one direction or the other, caster wheel means depending from the actuator, a pair of laterally spaced rack bars on the tractor for sliding movement longitudinally thereof, a member pivoted to the rear end of each rack bar and having a pair of spaced rollers to receive therebetween a portion of the cross member of the actuator whereby upon rearward shifting movement of one or the other of the rack bars, rocking movement is imparted to the actuator, pinions engaging said rack bars respectively, clutch and power transmission means connecting said power plant and said pinions, and means for selectively operating said clutch means for selectively driving said rack bars.

EDWIN H. BARNES.

REFERENCES CITED

The following references are of record in the file of this patent:

UNITED STATES PATENTS

| Number | Name | Date |
| --- | --- | --- |
| 1,008,837 | Luke et al. | Nov. 14, 1911 |
| 1,368,433 | Hicks | Feb. 15, 1921 |
| 1,376,344 | Lamiell | Apr. 26, 1921 |
| 1,385,193 | Showalter | July 19, 1921 |
| 1,851,142 | Welbourne | Mar. 29, 1932 |
| 2,089,137 | Slife et al. | Aug. 3, 1937 |
| 2,339,225 | Strandlund | Jan. 11, 1944 |